United States Patent [19]

Kaiser et al.

[11] 3,876,582

[45] Apr. 8, 1975

[54] STOVING LACQUERS WHICH CAN BE DILUTED WITH WATER

[75] Inventors: Bernd-Ulrich Kaiser, Krefeld; Rolf Dhein, Krefeld-Bockum; Rolf Kuchenmeister; Jochen Schoeps, both of Krefeld, all of Germany

[73] Assignee: Bayer Aktiengesellschaft, Leverkusen, Germany

[22] Filed: May 21, 1973

[21] Appl. No.: 362,482

[30] Foreign Application Priority Data

May 26, 1972 Germany............................ 2225646

[52] U.S. Cl. ... 260/75 UA; 260/29.2 N; 260/29.2 E; 260/29.4 R
[51] Int. Cl............................................ C08g 17/12
[58] Field of Search................ 260/75 UA, 76, 75 N

[56] References Cited
UNITED STATES PATENTS

| | | |
|---|---|---|
| 3,324,084 | 6/1967 | Horn et al.............................. 260/75 |
| 3,326,860 | 6/1967 | Kramer et al........................ 260/75 |
| 3,530,202 | 9/1970 | Fekete et al........................ 260/861 |
| 3,533,999 | 10/1970 | Fekete et al........................... 260/75 |
| 3,560,445 | 2/1971 | Fekete et al........................... 260/75 |
| 3,674,727 | 7/1972 | Fekete et al........................... 260/22 |

*Primary Examiner*—Melvin Goldstein
*Attorney, Agent, or Firm*—Connolly and Hutz

[57] ABSTRACT

Object of the invention are binders based on amine salts of polyesters from polyhydric alcohols and at least three different dicarboxylic acids, the dicarboxylic acids consisting of 1.1 to 55 mol percent of a mixture of maleic acid and tetrahydrophthalic acid and of 98.9 to 45 mol percent of at least one further dicarboxylic acid. These binders are suitable for "coilcoating" and give even at temperatures above 250°C very glossy, white, elastic and hard coatings.

9 Claims, No Drawings

STOVING LACQUERS WHICH CAN BE DILUTED WITH WATER

Aqueous binder systems have been known for a long time. They are preferably used, in combination with aminoplasts, as aqueous stoving lacquers. Recently, however, air-drying systems have also been introduced. The drying and curing conditions for such coatings lie between room temperature and 250°C.

As a rule, non-aqueous systems containing solvents are used for "coil coating" which is constantly gaining in importance.

The advantage of aqueous systems over non-aqueous systems is evident. Thus, for example, the fire hazard associated with the use of customary organic solvents, and the adverse physiological action of such solvents, are eliminated.

It is the aim of the present invention to develop aqueous binder systems which are suitable for coil coating and which give, even at temperatures above 250°C, very glossy, white, elastic and hard coatings of excellent weathering resistance.

The aqueous binder systems hitherto known do not solve the problem presented. Thus, the binders according to DOS (German Offenlegungsschrift 1,495,244, which are obtained by reaction of a polyester containing hydroxyl groups and having an acid number of less than 40, preferably less than 20, and a ratio of molar carboxyl equivalents per batch to molar hydroxyl equivalents per batch of between 0.6 and 0.9, with one or more polycarboxylic acid anhydrides and subsequent neutralisation of the free carboxyl groups with ammonia or organic amines, are unsuitable for the manufacture of high gloss top lacquerings.

The examples of DOS (German Offenlegungsschrift 1,495,244 show measured values of at most 106 in the Lange Glossmeter, corresponding to 46 in the Gardner-20° instrument, these being gloss values which do not meet the "coil coat" requirements.

Binders which have been manufactured according to DAS (German Offenlegungsschrift) 1,519,146 from alkyd resins with a ratio of the condensed polyhydric alcohols to the condensed dicarboxylic acids of 1:1 to 1.3:1, by half-ester formation with tetrahydrophthalic acid, were developed - as can be seen from the examples - for the normal stoving range of around 150°C. They are unsuitable for coatings by the "coil coat" process since the systems based on tetrahydrophthalic acid half-esters do not give coatings of adequate gloss and whiteness under the extreme stoving conditions customary for these systems. (See comparison experiment d.)

The coating mixtures described in German Offenlegungsschriften 1,805,182 to 1,805,199, 2,012,525, 2,012,526, 2,013,097 and 2,013,702, for the manufacture of which dicarboxylic acid mixtures with more than two dicarboxylic acids can be employed, also do not fulfil the task presented. Whilst it is also possible to produce aqueous stoving lacquer systems, their maximum stoving temperature is only 250°C.

It has now been found, surprisingly, that the set aim is achievable if binders based on amine salts of polyesters from polyhydric alcohols and at least three different dicarboxylic acids are employed, with the dicarboxylic acids consisting of 1.1 to 55 mol per cent, preferably 5 to 25 mol per cent, of a mixture of maleic acid and tetrahydrophthalic acid and of 98.9 to 45 mol per cent, preferably 95 to 75 mol per cent, of at least one further dicarboxylic acid, and the molar ratio of maleic acid to tetrahydrophthalic acid being equal to or greater than 1, especially 1 to 100, preferably 2 to 25.

The action of the combination of the special mixture of maleic acid and tetrahydrophthalic acid with at least one further dicarboxylic acid is specific for high gloss and white coatings at high stoving temperatures since it is found that the use, which is in itself known, of mixtures of several dicarboxylic acids does not suffice but that within the abovementioned limits in which the mixture of maleic anhydride and tetrahydrophthalic acid, combined with at least one further dicarboxylic acid, is to be present, it is only the molar ratio of maleic acid to tetrahydrophthalic acid which determines the technical advance.

The nature and amount of the dicarboxylic acids to be used, and the molar ratio of the mixture of maleic acid and tetrahydrophthalic acid are so specific that no other dicarboxylic acid combination results in high gloss and a good white shade at high stoving temperatures. Thus coatings in which, for example, the maleic acid is missing, are not glossy and furthermore in part their whiteness is inadequate.

If the tetrahydrophthalic acid is absent, the coatings are admittedly, in part, white, but are again not glossy. If, on the other hand, exclusively maleic acid and tetrahydrophthalic acid are employed as dicarboxylic acids for the binders, the coatings are again not glossy, even at a molar ratio of maleic acid to tetrahydrophthalic acid of 1 to 100.

The advantage described only arises if at least three dicarboxylic acids are employed, with the proportion of the dicarboxylic acid mixture of maleic acid and tetrahydrophthalic acid varying within the limits of 1.1 to 55 mol per cent, preferably 5 to 25 mol per cent. However, the decisive factor is that the molar ratio of maleic acid to tetrahydrophthalic acid must be equal to or greater than 1, since otherwise coatings of inadequate gloss are obtained.

Suitable dicarboxylic acids which can be used conjointly are aromatic, cycloaliphatic and aliphatic dicarboxylic acids with 4 to 12 carbon atoms, for example phthalic acid, isophthalic acid, terephthalic acid, hexahydrophthalic acid, hexahydroisophthalic acid, hexahydroterephthalic acid, methyl-tetrahydrophthalic acid, endomethylenetetrahydrophthalic acid, endoethylenetetrahydrophthalic acid, adipic acid, succinic acid, glutaric acid, fumaric acid and suberic acid, with the use of phthalic acid, isophthalic acid and adipic acid being preferred.

The polyesters can be modified in a manner which is in itself known by co-condensation of up to 40 mol per cent, preferably of up to 20 mol per cent, of monocarboxylic acids, such as benzoic acid, butylbenzoic acid and hexahydrobenzoic acid, or of other aliphatic, cycloaliphatic or aromatic monocarboxylic acids. However, the co-condensation of up to 20 mol per cent of tribasic and tetrabasic carboxylic acids, such as trimellitic acid and pyromellitic acid, is also possible.

As polyhydric alcohols it is possible to employ dihydric aliphatic and cycloaliphatic alcohols with 2 to 15 carbon atoms, such as ethylene glycol, propylene glycols, diethylene glycol, dipropylene glycol, butanediols, neopentyl glycol, hexanediols, perhydrobisphenol and dimethylolcyclohexane, as well as trihydric alcohols, such as glycerine, trimethylolethane, trimethylolpropane and trimethylolhexane. Alcohols of higher functionality, such as pentaerythritol or dipentaerythritol, as well as mixtures of polyhydric alcohols, can also be used.

The choice and the ratio of the polyhydric alcohols and of the dicarboxylic acids to be used conjointly depends on the particular end use of the lacquerings. For hard versions, 1,2-propanediol and phthalic acid are preferred, whilst 1,6-hexanediol and adipic acid have an elasticising action. Frequently, combinations of components which confer hardness and of elasticising components are of advantage. Thus, the coil coat requirements of hardness, elasticity and gloss retention are fulfilled outstandingly when using 1,2-propanediol, 1,1,1-trimethylolpropane, isophthalic acid, adipic acid, maleic acid and tetrahydrophthalic acid.

The polyesters are manufactured in a manner which is in itself known by condensation in accordance with the customary processes, the polyester being condensed until the desired acid number is reached. The acid number should be greater than 35. Frequently, acid numbers in the range of 38 to 60 suffice and these, in conjunction with an OH number of the polyester of between 50 and 150 yield, after neutralisation, binders which can be diluted with water and which then cure, to give extremely water-resistant coatings, with aminoplasts which can be diluted with water, such as urea-formaldehyde resins, triazine resins, for example formoguanamine resins, acetoguanamine resins or benzoguanamine resins or melamine resins or their defined intermediates, of which the methylol groups can be partially or completely etherified with monohydric alcohols with 1 to 4 carbon atoms. Of course, however, higher acid numbers or OH numbers are also possible.

The polyesters can, however, also be manufactured according to the known two-stage process. In that case, an appropriate procedure is to react a polyester containing hydroxyl groups, having an acid number of less than 15 and containing polyhydric alcohols and dicarboxylic acids condensed in the molar ratio of between 1:1 and 1.3:1, with a mixture of tetrahydrophthalic acid and maleic acid, to give the half-ester.

After completion of the reaction, the polyesters are appropriately mixed with organic solvents which are wholly or partially water-miscible. Such organic solvents are, in particular, ether-alcohols, such as ethylene glycol monomethyl ether, monoethyl ether or monobutyl ether, but also alcohols, esters, ketones, keto-alcohols or ethers. They favourably assist the ability of the product to be diluted with water, and lower the viscosity.

The conversion of the polyesters into their salts which can be diluted with water takes place in a manner which is in itself known, by addition of amines. The amount of amine is preferably so chosen that a sample diluted with water and optionally with organic solvents, and containing 30% of polyester, has a pH value not exceeding 8, measured with indicator paper, in particular a pH value of between 6.8 and 7.5. Whilst lower pH values are to be avoided for reasons concerned with the stability of the lacquer, higher pH values cause reductions in gloss.

Examples of suitable amines are primary, secondary and tertiary alkylamines, such as methylamine, diethylamine and triethylamine, and amino-alcohols, such an ethanolamine, diethanolamine, triethanolamine, N-methylethanolamine, N,N-dimethylethanolamine, 3-aminopropanol and their ethers, such as 3-methoxypropylamine, but also morpholine. Triethylamine, diethanolamine and dimethylethanolamine have proved particularly suitable examples of these series.

The neutralised batches can be further diluted with water as required.

Usually, the aqueous lacquers are manufactured by grinding solutions which are as concentrated as possible and optionally contain a little water, with pigments on roll mills or ball mills. Pastes are thus obtained from which the desired lacquers can be manufactured by adding water and further polyester resin solution, and also adding aminoplasts which equally can be diluted with water.

The lacquers are applied according to the coil coat process and can be cured at temperatures above 250°C to give high gloss white coatings. Of course, other forms of application, such as spraying, dipping, casting and brushing are also possible, and of course curing temperatures of between 80°C and 250°C are also possible given an appropriate period of stoving.

Unless otherwise noted, the parts quoted in the examples which follow are parts by weight.

EXAMPLE 1

59.3 parts of 1,2-propanediol, 40.2 parts of 1,1,1-trimethylolpropane, 46.7 parts of adipic acid and 78.0 parts of isophthalic acid are esterified in a nitrogen atmosphere at 220°C, whilst stirring, until an acid number between 4 and 5 and a viscosity of 100 seconds (measured at 60% strength in dimethylformamide according to DIN 53,211) are reached.

This polyester resin is reacted with a mixture of 11.7 parts of maleic anhydride and 7.8 parts of tetrahydrophthalic anhydride at 130°C until an acid number of about 49 and a viscosity of about 300 seconds (measured at 60% strength in dimethylformamide according to DIN 53,211) are reached. The polyester then contains, condensed in it, 17.7 mol per cent of the mixture of maleic acid and tetrahydrophthalic acid and 82.3 mol per cent of further dicarboxylic acids, in this example adipic acid and isophthalic acid. The molar ratio of maleic acid to tetrahydrophthalic acid in the mixture of maleic acid and tetrahydrophthalic acid is $V = 2.\overline{3}$...

... The polyester resin is dissolved in ethylene glycol monobutyl ether to give a 60% strength solution and is treated at room temperature with dimethylethanolamine in such amounts, and diluted with distilled water to a resin content of 55%, that a further dilution of this solution with water to give a resin content of 30% has a pH value of 6.8 to 7.0 (measured with MERCK special indicator paper, pH range 6.4 to 8.0). The viscosity of this 30% strength solution is about 60 seconds.

A lacquer of 100 parts of the 55% strength solution, 44 parts of titanium dioxide (rutile) and 8.47 parts of a customary 60% strength aqueous solution of a melamine resin, such as is obtained as a curing component for stoving lacquers capable of dilution with water, by condensation of melamine with formaldehyde and etherification of the methylol group with methanol, is diluted with water to a viscosity of 100 seconds and after a ripening time of 24 hours is spread on an iron sheet by means of a film spreader and cured for 1 minute at 270°C in a circulating air oven. Very hard and elastic coatings with good adhesion and excellent gloss retention in the Wether-o-meter, with a degree of gloss of 80, are obtained. (The gloss is assessed according to ASTM D 523-53 T at an angle of reflection of 20° in a Gardner glossmeter. The higher the value quoted, the better is the gloss). The measurement of the whiteness gives a value of 89.3. (The values of the whiteness quoted in the application are calculated from $W = Y + 3(Z - X)$ according to the publication in the journal "Die Farbe," Musterschmidt Verlag, Volume 8, 1959, page 196. The higher the value quoted, the better is the whiteness.)

In contrast to the products according to the invention, comparison experiments a to k show lacquer raw materials which at the stoving temperature of 270°C only yield matt lacquerings which are of moderate gloss and in part have yellowed. In the polyesters on which the lacquer raw materials are based, either maleic acid and/or tetrahydrophthalic acid is lacking.

Comparison experiments a to k

If the polyester resin described in Example 1, with the acid number of between 4 and 5, is reacted with the acid anhydrides or acid anhydride mixtures listed in Table I below, in such quantity ratios that comparable alkyl half-esters of approximately the same final acid numbers are produced, and if 55% strength neutralised solutions are prepared from these resins in accordance with Example 1, lacquers of the composition of Example 1 can be manufactured therefrom, but these, in contrast to Example 1, only yield matt to slightly glossy and in part yellowed lacquerings.

15.6. A lacquer is prepared in accordance with Example 1 from the 55% strength neutralised solution. Films having a degree of gloss of 50 and a whiteness of 77.1 are obtained.

The experiments which follow show that the gloss depends on the molar ratio of maleic acid to tetrahydrophthalic acid. Only in the case of V being equal to or greater than 1 are high gloss lacquerings obtained.

EXAMPLE 2

If the polyester resin of acid number between 4 and 5, described in Example 1, is reacted with mixtures of maleic anhydride and tetrahydrophthalic anhydride, which are characterised by the molar ratio V (V = molar ratio of maleic acid to tetrahydrophthalic acid) in such quantity ratios that comparable alkyd half-esters of approximately the same acid numbers are produced, and if 55% strength neutralised solutions are prepared according to Example 1 from these resins, lacquers of the composition of Example 1 can be manufactured therefrom, but amongst these only the lacquers with V equal to or greater than 1 give high gloss coatings.

TABLE II

|  | Example 1 | Example 2 | Comparison experiment |
|---|---|---|---|
| V (molar ratio of maleic acid to tetrahydrophthalic acid) | 2.3 | 1 | 0.43 |

TABLE I

|  | Dicarboxylic acids used for manufacture, in addition to about 49 mol per cent of isophthalic acid and 33 mol per cent of adipic acid | Degree of gloss of the lacquering which has been stoved for 1 minute at 270°C | Whiteness of the lacquering which has been stoved for 1 minute at 270°C |
|---|---|---|---|
| Example 1 | Maleic acid and tetrahydrophthalic acid, $V = 2.3$ | 80 | 89.3 |
| Comparison examples a | Phthalic acid | 54 | 86.8 |
| b | Succinic acid | 39 | 88.8 |
| c | Maleic acid | 49 | 77.0 |
| d | Tetrahydrophthalic acid | 57 | 67.7 |
| e | Hexahydrophthalic acid | 60 | 79.7 |
| f | 3-Methyltetrahydrophthalic acid | 41 | 83.6 |
| g | Maleic acid and 3-methyltetrahydrophthalic acid, $V = 2.3$ | 54 | 66.0 |
| h | Succinic acid and tetrahydrophthalic acid, $V = 1$ | 39 | 74.0 |
| i | Succinic acid and maleic acid, $V = 1$ | 56 | 65.3 |
| j | Hexahydrophthalic acid and tetrahydrophthalic acid | 42 | 78.8 |
| k | Phthalic acid and tetrahydrophthalic acid, $V = 2.3$ | 38 | 83.4 |

Comparison experiment 1 below shows that lacquers based on polyesters which only contain maleic acid and tetrahydrophthalic acid as the dicarboxylic acid also do not give any high gloss lacquerings even at a molar ratio of maleic acid to tetrahydrophthalic acid which is greater than 1.

Comparison experiment 1

3.8 parts of 1,2-propanediol, 64.9 parts of 1,6-hexanediol, 53.6 parts of 1,1,1-trimethylolpropane, 64.9 parts of maleic anhydride and 9.4 parts of tetrahydrophthalic anhydride are esterified in a nitrogen atmosphere at 220°C whilst stirring until an acid number of 43.3 and a viscosity of 267 seconds (measured at 60% strength in dimethylformamide) are reached. The molar ratio of maleic acid to tetrahydrophthalic acid is

| Degree of gloss of the lacquering stoved for 1 minute at 270°C | 80.0 | 74 | 54.0 |
|---|---|---|---|

Example 3 shows that usable binders can also be obtained by direct condensation until an acid number of about 45 is reached. The molecular weight can be regulated through the amount of trihydric alcohol.

EXAMPLE 3

136.2 parts of phthalic anhydride, 64.9 parts of 1,6-hexanediol, 3.8 parts of 1,2-propanediol, 53.6 parts of trimethylolpropane, 9.4 parts of tetrahydrophthalic anhydride and 14.2 parts of maleic anhydride are esterified in a nitrogen atmosphere at 220°C whilst stirring until an acid number of 45.5 and a viscosity of 380 seconds (measured at 60% strength in dimethylformamide) are reached. The molar ratio of maleic acid to tetrahydrophthalic acid is 1.99. A lacquer is prepared according to Example 1 from the 55% strength neutralised solution. Films with a degree of gloss of 72 and a whiteness of 77.2 are obtained, which are extremely hard, elastic and water-resistant and show good gloss retention in the Wether-o-meter test.

What we claim is:

1. A polyester which comprises the condensation product of a dihydric aliphatic or cycloaliphatic alcohol having 2 to 15 carbon atoms and at least 3 dicarboxylic acids, said dicarboxylic acids consisting of (a) from 1.1 to 55 mol% of maleic acid and tetrahydrophthalic acid in a molar ratio of 1:1 to 1:100 and (b) from 98.9 to 45 mol % of at least one aromatic, cycloaliphatic or aliphatic dicarboxylic acid having 4 to 12 carbon atoms, said polyester having an acid number greater than 35 and a hydroxyl number of 50 to 150.

2. The polyester of claim 1 wherein there is from 5 to 25 mol % of (a) and from 95 to 75 mol % of (b).

3. The polyester of claim 1 wherein said molar ratio of maleic acid to tetrahydrophthalic acid is from 2 to 25.

4. The polyester of claim 1 wherein (b) is selected from the group consisting of phthalic acid, isophthalic acid, adipic acid and mixtures thereof.

5. The polyester of claim 1 having an acid number of 38 to 60.

6. The polyester of claim 1 having incorporated therein by condensation up to 40 mol % of a monocarboxylic acid.

7. The polyester of claim 1 having incorporated therein by condensation up to 20 mol % of a tribasic or tetrabasic carboxylic acid.

8. An amine salt of the polyester of claim 1.

9. The amine salt of claim 8 wherein said amine is selected from the group consisting of triethylamine, diethanolamine and dimethylethanolamine.

* * * * *

UNITED STATES PATENT OFFICE
CERTIFICATE OF CORRECTION

PATENT NO. : 3,876,582
DATED : April 8, 1975
INVENTOR(S) : Bernd-Ulrich Kaiser et al It is certified that error appears in the above-identified patent and that said Letters Patent are hereby corrected as shown below:

Col. 2, line 4, "1 to 100" should read -- 1:1 to 100:1 -- and "2 to 25" should read -- 2:1 to 25:1 --;

line 31, "1 to 100" should read -- 1:1 to 100:1 --.

Col. 7, line 17, "1:100" should read -- 100:1 --.

Col. 8, lines 4 and 5, "2 to 25" should read -- 2:1 to 25:1 --.

Signed and Sealed this twenty-seventh Day of January 1976

[SEAL]

Attest:

RUTH C. MASON
Attesting Officer

C. MARSHALL DANN
Commissioner of Patents and Trademarks